United States Patent
Weir et al.

[19]

[11] Patent Number: 6,096,700

[45] Date of Patent: Aug. 1, 2000

[54] ENVIRONMENTAL WIPE SOLVENT COMPOSITIONS AND PROCESSES

[75] Inventors: John Douglas Weir, Huntington, N.Y.; Joanne Swiderski McLaughlin, Long Beach, Calif.

[73] Assignee: Northrop Grumman Corporation, Los Angeles, Calif.

[21] Appl. No.: 09/138,618

[22] Filed: Aug. 24, 1998

[51] Int. Cl.[7] ................................ C11D 3/18; C11D 9/36
[52] U.S. Cl. ...................... 510/245; 510/254; 510/251; 510/271; 510/371; 510/407; 510/466; 510/432; 427/563; 427/567; 427/568; 427/574; 427/578; 427/583; 427/219; 427/220; 427/387
[58] Field of Search ..................... 510/245, 254, 510/251, 271, 371, 407, 466, 432; 427/563, 567, 568, 574, 578, 583, 219, 220, 387

[56] References Cited

U.S. PATENT DOCUMENTS

| | | | |
|---|---|---|---|
| 3,754,974 | 8/1973 | Hirota | 117/75 |
| 3,890,149 | 6/1975 | Schlesinger et al. | 96/33 |
| 3,997,485 | 12/1976 | Dowbenko et al. | 260/22 S |
| 4,499,150 | 2/1985 | Dowbenko et al. | 428/447 |
| 4,535,382 | 8/1985 | Wada et al. | 361/319 |
| 4,544,413 | 10/1985 | Boots et al. | 106/287.14 |
| 4,559,247 | 12/1985 | Kopf et al. | 427/386 |
| 4,681,808 | 7/1987 | Lefler, III | 428/425.5 |
| 4,835,014 | 5/1989 | Roth et al. | 427/299 |
| 4,859,359 | 8/1989 | DeMatteo et al. | 252/174.15 |
| 4,879,345 | 11/1989 | Connelly et al. | 525/104 |
| 5,019,173 | 5/1991 | Gettings et al. | 134/4 |
| 5,212,017 | 5/1993 | Meder | 428/447 |
| 5,213,828 | 5/1993 | Winter et al. | 428/46 |
| 5,234,983 | 8/1993 | Valenty | 524/283 |
| 5,288,517 | 2/1994 | Kanno et al. | 427/244 |
| 5,312,520 | 5/1994 | Chung | 134/7 |
| 5,344,890 | 9/1994 | Miyazono et al. | 525/326.5 |
| 5,424,133 | 6/1995 | Eckhardt et al. | 468/447 |
| 5,441,573 | 8/1995 | Kondo et al. | 134/8 |
| 5,534,306 | 7/1996 | Rockrath et al. | 427/407.1 |
| 5,607,901 | 3/1997 | Toups, Jr. et al. | 507/103 |

*Primary Examiner*—Yogendra Gupta
*Assistant Examiner*—Charles Boyer
*Attorney, Agent, or Firm*—Terry J. Anderson; Karl J. Hoch, Jr.

[57] ABSTRACT

A non-chrome process for the pretreatment of substrate surfaces to simultaneously clean them and improve their bonding strength for organic coatings such as adhesives, protective primers, sealants, paints, composites and similar materials conventionally bonded to such substrates, including non-chromated or chromated curable organic resin protective coatings applied directly to bare aluminum substrates. The invention involves the use of novel wipe solvent compositions containing a major volume of an environmentally-safe volatile organic solvent which has a low composite vapor pressure or is otherwise exempt from federal, state or local regulations, and a minor volume of a polyfunctional coupling agent, preferably of the silane type.

4 Claims, 1 Drawing Sheet

ENVIRONMENTAL WIPE SOLVENT COMPOSITIONS AND PROCESSES

BACKGROUND OF THE INVENTION

1. Field of the Invention

The present invention relates to wipe solvent compositions for application to various substrates, including metal finishes/coatings such as anodized, Alodined, deoxidized, abraded, bare metals, fiberglass, plastic films, organic coatings, composites, glass and other substrates, for purposes of cleaning the substrate surface to improve the receptivity and bonding properties of the substrate relative to organic coatings, adhesives, adhesive coatings, primers, adhesive primers, sealants, paints, honeycomb structures and similar materials conventionally bonded to such substrates.

2. State of the Art

It is known to improve the receptivity of substrates for paints, primers and adhesive layers by treating the substrate surface with mechanical abrasive operations such as blasting followed by cleaning with an organic solvent such as methyl ethyl ketone following by brush-coating with a dilute aqueous silane solution and drying. Reference is made to U.S. Pat. No. 5,312,520. The process according to the patent is objectionable because methyl ethyl ketone is a hazardous air pollutant, dangerous to worker safety, and the process requires three separate steps, with the silane brushing step being repeated three times using alternating brush strokes.

Reference is also made to U.S. Pat. No. 5,424,133 for its disclosure of a process for preparing a plastic film or composite substrate surface for adhesive bonding coating operations by applying to the surface an abrasive composition containing abrasive particles such as silicon-containing particles and rubbing the coating into the surface to fix the abrasive particles thereto. The surface is first degreased by wiping with a solvent such as isopropanol.

It is known to treat or coat aluminum and other substrates to improve their bonding properties relative to primers, paints, adhesive coatings and other substrates such as composites, metals, glass, etc. Such process typically requires the use of a chemical conversion coating (CCC), such as Alodine, over the aluminum surface to improve the bonding properties of the substrate for paints, adhesives, etc., while enhancing the corrosion resistance of the coating system. The chemical conversion coating composition typically contains chromic acid, a fluoride acid salt and accelerators.

Chromium is an environmentally-objectionable chemical targeted by the EPA for reduction or elimination, and the replacement of chromium-containing plating and treatment baths with non-chromated baths has been the subject of extensive academic and industrial research.

Alternative chromium-free coating compositions have been developed but the process of applying such compositions requires multiple steps, each of which usually requires a different heated process tank as opposed to the single heated process tank required for the conventional chromated chemical conversion coating (CCC) process. The energy and facility requirements of this alternative process create substantial difficulty and expense from the standpoint of implementation into a production facility.

Another alternate chemical conversion process involves the use of a cobalt-amine oxidizing composition such as Alodine 2000 to form a chemical oxide film on aluminum substrates. Such process requires the use of two separate heated process tanks. In the first step a chemical oxide layer is formed on the surface of the aluminum using a cobalt-amine oxidizing bath to form an oxide layer about 1000 angstrom units in thickness. In the second step the oxidized aluminum substrate is immersed in a second tank containing a composition which seals the oxide layer to impart corrosion resistance to the substrate. The first step increases the bonding properties of the aluminum substrate while the second step is required to impart corrosion resistance.

Clearly, it is highly desirable to provide a process which eliminates the need for chemical conversion steps which require the use of chromium or require the use, of several heated baths and several steps to enhance adhesion properties to the substrate.

Such processes are tedious, time-consuming and/or dangerous, and are unsatisfactory for use on certain substrates, where abrasion or blasting cannot be used, and are ineffective for certain coatings and bonding operations.

SUMMARY OF THE INVENTION

The present invention is based upon the discovery that environmentally-safe non-chrome surface treating wipe solvent compositions can be produced by incorporating conventional silane or coupling agents in effective, environmentally-safe organic solvents such as naphtha, methyl propyl ketone, isopropyl alcohol, acetone and similar safe, non-carcinogenic volatile organic solvents, or blends of such solvents, having a composite vapor pressure below about 45 mmHg, or a volatile organic compound considered exempt by federal, state or local regulations, and that such compositions can be wiped onto various substrate surfaces to simultaneously clean the surfaces and deposit the coupling agent thereon for subsequent bonding to an applied primer, paint, adhesive layer and/or to another substrate such as of composite, metal, glass, plastic or honeycomb composite.

An advantage of the present process resides in the elimination of the conventional chemical conversion coatings that are applied to substrates, such as aluminum, to improve the bonding properties and corrosion-resistance of such substrates. The present process enables the direct application of novel surface treating wipe solvent(s) coatings to the surface of the substrate to simultaneously clean the substrate surface with environmentally-friendly organic solvents and to deposit thereon and bond thereto a coupling agent which functions as a bonding link between the substrate surface and the reactive organic groups contained in the corrosion-resistive primer composition to provide excellent bonding properties therebetween.

THE DRAWING

FIG. 1 is a chart showing the steps of the present process for preparing the surface of aluminum substrates for the application of paint primer compositions, preferably non-chromated primer compositions.

DETAILED DESCRIPTION

Figure 1:
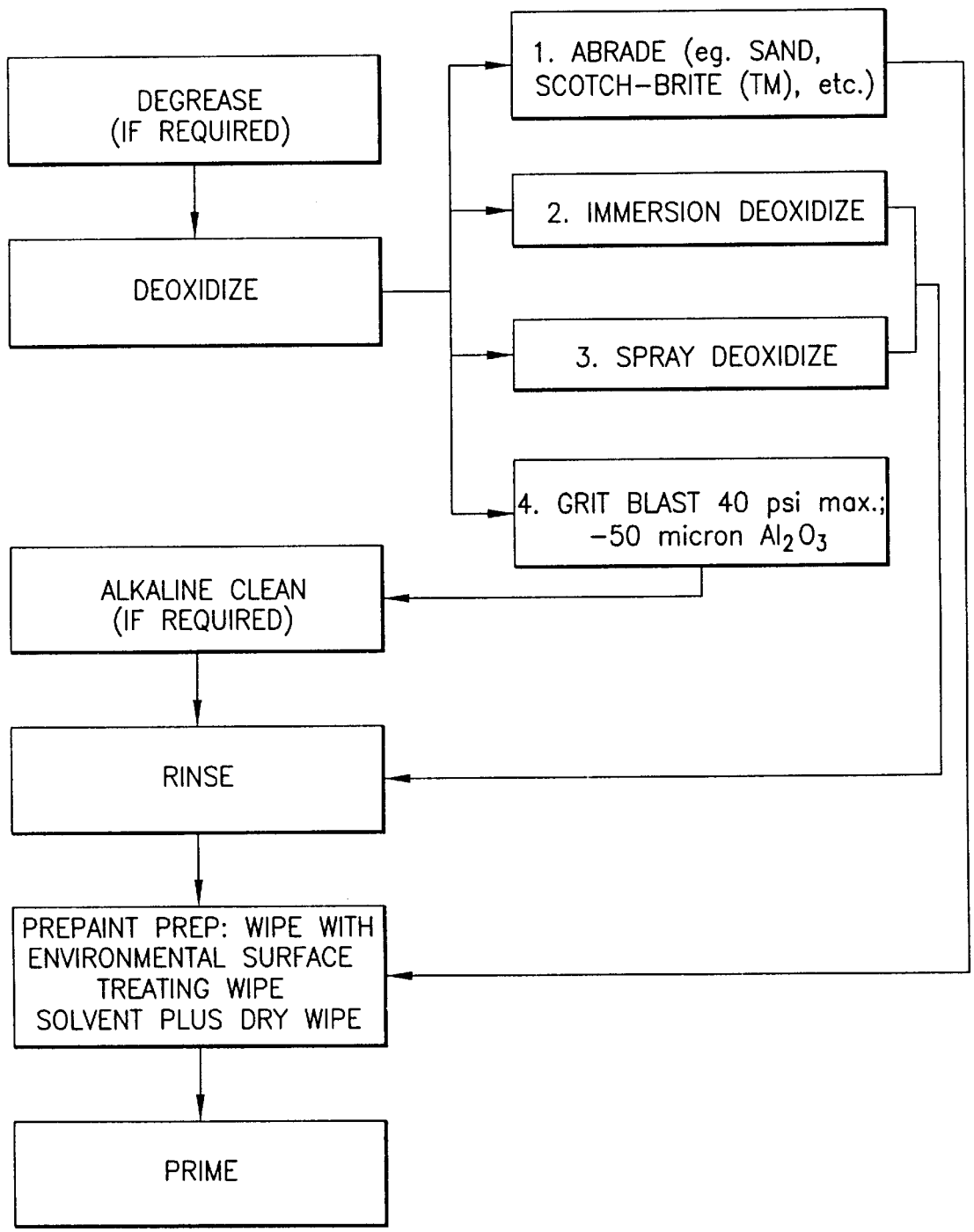

The novel process of the present invention involves the addition of conventional silane type polyfunctional coupling agents to major amounts by volume of environmentally-safe organic wipe solvents generally having a low vapor pressure to form novel wipe solvent compositions for cleaning the surface of a substrate such as that of metal, composite, glass, plastic or other material prior to the application of coatings of primer, paint, adhesive and/or similar layers and/or prior to the lamination of such substrates to each other or to support structures such as honeycomb bodies, while simultaneously depositing and bonding the coupling agent to the cleaned surface of the substrate. Such process avoids the use of environmentally-objectionable volatile organic solvents which are dangerous to the environment and to the health of workers, eliminates the need for separate cleaning steps and coating agent-application steps, and eliminates the need for conventional chemical conversion or oxidation coating steps on metal substrates such as aluminum, enabling the direct application and bonding of corrosion-resisting coatings such as chromated or unchromated primers, paints, adhesive resin layers, sealant layers, etc., to the substrate to impart corrosion resistance thereto, while coupling the coating directly to the substrate to avoid peeling, flaking or other separation of the coating and top coatings or laminates from the substrate. The present process targets the coupling agent directly to the area of the substrate to be coated, and eliminates the need for the coupling agent to migrate through a resin matrix to couple to the substrate as in the case where the coupling agent is present in an after-applied resinous primer, paint, adhesive or other layer, such as of curable epoxy resin or curable polyurethane resins from polyester resins and isocyanate curing agents.

The present novel surface treatment wipe solvent compositions comprise dilute solutions of one or more polyfunctional coupling agent(s) in one or more environmentally-safe volatile organic solvents. Such compositions contain from about 0.1% up to about 10% by volume of the coupling agent.

Preferred volatile organic solvents include naphtha, methyl propyl ketone, acetone, isopropyl alcohol and commercially available solvents and blends such as Shell Tolu-Sol® WHT, (mixed aliphatic ($c_7$–$c_8$ cycloparoffins) solvents), Eco Solv® 1, 20 and 25, Prep Solv®, Enviro Sol® 655(isoparaffins), Oxsol® 100 (fluorochlorobenzene), and mixtures or blends or such environmentally and/or legally acceptable solvents.

Suitable silane-type polyfunctional coupling agents include silane coupling agents listed in Dow Corning Bulletin Form No. 23-012C-90. A preferred silane additive to the present wipe compositions comprises a 0.1 to 5% solution of hydroxyl- or lower alkoxy-terminated silane compound, such as 3-glycidoxy-propyltrimethoxy silane which is commercially-available under the trade designation Dow Corning Z-6040. This is an organofunctional silane which hydrolyzes to form silanol groups capable of bonding with inorganic surfaces such as metal and having an affinity for organic coatings applied thereover. Also suitable is a composition available under the trademark Rain-X® which is a 9% solution of a mixture of siloxane silanes in water-miscible alcohols, essentially ethyl alcohol, as well as aminoalkoxy silane reaction products.

A preferred embodiment of the present invention involves the application of the wipe solvent/coupling agent composition directly to the substrate surface being coupled, such as aluminum. In cases where the aluminum surface is oxidized, Alodined or anodized, the surface is lightly treated with an abrasive pad such as Scotch-Brite™ No. 7447 pad (silicon carbide/aluminum oxide) to remove the oxide, Alodine or anodized layer, or is soaked in an alcoholic phosphoric acid bath for about 10 minutes to etch away the oxidized layer and rinsed in water to remove all traces of the bath, or is deoxidized according to other standard methods of deoxidation.

In the preferred processes of the present invention, illustrated by FIG. 1 of the drawing, the aluminum substrate is surface-prepared in a series of sequential steps in which it is first degreased if necessary, such as by cleaning with acid, alkali or solvent wipe, rinsed and then deoxidized by one of the indicated methods 1 to 4. If method 1 is used, the substrate is then wiped with the novel wipe solvent composition of the present invention, containing a polyfunctional coupling agent, and is then coated with paint primer composition, preferably non-chromated. If deoxidation methods 2, 3 or 4 are used, the substrate is then rinsed before application if the wipe solvent and paint primer coating.

The following comparative tests demonstrate the improvement in bonding strength of resinous primer coatings to various aluminum substrates, and to graphite epoxy composite laminates, as measured by the conventional Lap Shear Test, ASTM D-1002. In each that the shear strength values represent the average of five specimens.

EXAMPLE 1

The substrate was bare aluminum in the form of coupons 4"×6" and 0.063" thickness. The test panel surfaces designated 1A and 2A were pretreated with a deoxidation treatment according to Northrop/Grumman Document No. MEPS 4000-47 whereas the test panel surfaces 3A and 4A were not pretreated.

The test panel surfaces 1A and 3A were wiped clean with 50% naphtha/50% methyl propyl ketone (MPK) solvent, dry wiped, coated with a GM 4004 221 (Hysol EA 9394) epoxy resin adhesive layer and bonded within 30–40 minutes to identical 1A and 3A panel surfaces, respectively.

The test panel surfaces 2A and 4A were wiped clean with the present novel wipe solvent/coupling agent compositions comprising 95% by volume of the 50:50% by volume mixture of naphtha and methyl propyl ketone and 5% by volume of Dow Corning Z-6040 silane coupling agent, dry wiped, coated with a GM 4004 221 (Hysol 9394) adhesive layer and bonded within 30–40 minutes to identical 2A and 4A panel surfaces, respectively.

All of the bonded test panels were allowed to cure for 72 hours at room temperature and then baked for 2 hours at 150° F., cooled to room temperature and then band sawed into lap shear test specimens. All testing was conducted in accordance with ASTM D 1002 titled "Strength Properties of Adhesives in Shear by Tension Loading (Metal to Metal) Test" at room temperature (75° F.), with the following test results:

| | Spec. Width Inches | Overlap Inches | Bondline Inches | Fail Load lbs. | Shear Strength, psi | Mode of Failure |
|---|---|---|---|---|---|---|
| Wiped With Naphtha/MPK-Panels 1A | | | | | | |
| 1 | 0.991 | 0.50 | 0.005 | 287 | 579 | 100% Adhesive |
| 2 | 0.989 | 0.50 | 0.005 | 381 | 770 | 100% Adhesive |

-continued

| | Spec. Width Inches | Overlap Inches | Bondline Inches | Fail Load lbs. | Shear Strength, psi | Mode of Failure |
|---|---|---|---|---|---|---|
| 3 | 0.986 | 0.50 | 0.005 | 353 | 716 | 100% Adhesive |
| 4 | 0.990 | 0.50 | 0.005 | 339 | 685 | 100% Adhesive |
| 5 | 0.987 | 0.50 | 0.005 | 264 | 535 | 100% Adhesive |
| | | | | AVERAGE | 657 | |
| Wiped With Naphtha/Z-6040-Panels 2A | | | | | | |
| 1 | 0.981 | 0.50 | 0.005 | 489 | 997 | 100% Adhesive |
| 2 | 0.986 | 0.50 | 0.005 | 395 | 801 | 100% Adhesive |
| 3 | 0.989 | 0.50 | 0.005 | 530 | 1072 | 100% Adhesive |
| 4 | 0.986 | 0.50 | 0.005 | 621 | 1260 | 100% Adhesive |
| 5 | 0.988 | 0.50 | 0.005 | 647 | 1310 | 100% Adhesive |
| | | | | AVERAGE | 1088 | |
| | | | | IMPROVEMENT | 65.6% | |
| Wiped With Naphtha/MPK-Panels 3A | | | | | | |
| 1 | 0.986 | 0.50 | 0.005 | 251 | 509 | 100% Adhesive |
| 2 | 0.986 | 0.50 | 0.005 | 295 | 598 | 100% Adhesive |
| 3 | 0.983 | 0.50 | 0.005 | 267 | 543 | 100% Adhesive |
| 4 | 0.986 | 0.50 | 0.005 | 261 | 529 | 100% Adhesive |
| 5 | 0.988 | 0.50 | 0.005 | 273 | 553 | 100% Adhesive |
| | | | | AVERAGE | 546 | |
| Wiped With Naphtha/Z-6040-Panels 4A | | | | | | |
| 1 | 0.986 | 0.50 | 0.005 | 385 | 781 | 100% Adhesive |
| 2 | 0.990 | 0.50 | 0.005 | 357 | 721 | 100% Adhesive |
| 3 | 0.987 | 0.50 | 0.005 | 313 | 634 | 100% Adhesive |
| 4 | 0.988 | 0.50 | 0.005 | 324 | 656 | 100% Adhesive |
| 5 | 0.990 | 0.50 | 0.005 | 343 | 693 | 100% Adhesive |
| | | | | AVERAGE | 697 | |
| | | | | IMPROVEMENT | 27.7% | |

As demonstrated by the test results, both the deoxidized Panels 2A and the non-pretreated Panels 4A have substantially-improved bonding strength as compared to Panels 1A and 3A, and the only difference to account for the improvement is the addition of the Z-6040 silane coupling agent to the wipe solvent to provide both cleaning of the substrate and bonding to the adhesive layer in a single step. The test results also demonstrate that the bonding strength provided by the present novel wipe solvent compositions is greatest when the compositions are directly applied to aluminum substrate surfaces which are pre-treated to remove surface oxidation, to enable the coupling agent to couple to and more intimately bond to the newly formed aluminum oxide surface.

EXAMPLE 2

This example demonstrates the improved bonding strength imparted to anodized aluminum substrates, pretreated by lightly abrading with Scotch-BriteTM pads (No. 7447) to partially remove the superficial aluminum oxide, and then wiped with naphtha solvent which, contains no coupling agent (Panel 1B) or which contains various amounts of Z-6040 silane coupling agent (Panels 2B, 3B, 4B, 5B and 6B). In each case the panels are dry wiped and adhesive bonded within 30–40 minutes, using GA 100 BD12 epoxy resin adhesive (Hysol EA9394), and cured at 150° F. for two hours following 24 hours at room temperature. The panels were then subjected to lap shear testing according to ASTM D-1002 with the following results:

| | Width Inches | Overlap Inches | Bondline Inches | Z-6040% | Fail Load lbs. | Shear Strength, psi | Mode of Failure |
|---|---|---|---|---|---|---|---|
| PANEL 1B | | | | | | | |
| 1 | 1.017 | 0.50 | 0.005 | 0.0 | 559 | 1099 | 100% Adhesive |
| 2 | 1.014 | 0.50 | 0.005 | 0.0 | 524 | 1034 | 100% Adhesive |
| 3 | 1.016 | 0.50 | 0.005 | 0.0 | 581 | 1144 | 100% Adhesive |
| 4 | 1.016 | 0.50 | 0.005 | 0.0 | 569 | 1120 | 100% Adhesive |
| 5 | 1.015 | 0.50 | 0.005 | 0.0 | 551 | 1086 | 100% Adhesive |
| | | | | | AVERAGE | 1096 | |
| PANEL 2B | | | | | | | |
| 1 | 1.011 | 0.50 | 0.005 | 0.20 | 791 | 1565 | 100% Adhesive |
| 2 | 1.016 | 0.50 | 0.005 | 0.20 | 733 | 1443 | 100% Adhesive |
| 3 | 1.016 | 0.50 | 0.005 | 0.20 | 787 | 1549 | 100% Adhesive |

-continued

|   | Width Inches | Overlap Inches | Bondline Inches | Z-6040% | Fail Load lbs. | Shear Strength, psi | Mode of Failure |
|---|---|---|---|---|---|---|---|
| 4 | 1.016 | 0.50 | 0.005 | 0.20 | 892 | 1756 | 100% Adhesive |
| 5 | 1.015 | 0.50 | 0.005 | 0.20 | 807 | 1590 | 100% Adhesive |
|   |   |   |   |   | AVERAGE IMPROVEMENT | 1581 44.3% |   |
| PANEL 3B |   |   |   |   |   |   |   |
| 1 | 1.016 | 0.50 | 0.005 | 0.50 | 683 | 1895 | 100% Adhesive |
| 2 | 1.013 | 0.50 | 0.005 | 0.50 | 683 | 2154 | 100% Adhesive |
| 3 | 1.016 | 0.50 | 0.005 | 0.50 | 733 | 1919 | 100% Adhesive |
| 4 | 1.014 | 0.50 | 0.005 | 0.50 | 759 | 1957 | 100% Adhesive |
| 5 | 1.016 | 0.50 | 0.005 | 0.50 | 604 | 2038 | 100% Adhesive |
|   |   |   |   |   | AVERAGE IMPROVEMENT | 1993 81.8% |   |
| PANEL 4B |   |   |   |   |   |   |   |
| 1 | 1.015 | 0.50 | 0.005 | 1.00 | 958 | 1888 | 100% Adhesive |
| 2 | 1.016 | 0.50 | 0.005 | 1.00 | 948 | 1866 | 100% Adhesive |
| 3 | 1.015 | 0.50 | 0.005 | 1.00 | 988 | 1947 | 100% Adhesive |
| 4 | 1.016 | 0.50 | 0.005 | 1.00 | 1080 | 2126 | 100% Adhesive |
| 5 | 1.017 | 0.50 | 0.005 | 1.00 | 965 | 1898 | 100% Adhesive |
|   |   |   |   |   | AVERAGE IMPROVEMENT | 1945 77.4% |   |
| PANEL 5B |   |   |   |   |   |   |   |
| 1 | 1.013 | 0.50 | 0.005 | 2.00 | 960 | 1895 | 100% Adhesive |
| 2 | 1.015 | 0.50 | 0.005 | 2.00 | 1093 | 2154 | 100% Adhesive |
| 3 | 1.017 | 0.50 | 0.005 | 2.00 | 976 | 1919 | 100% Adhesive |
| 4 | 1.015 | 0.50 | 0.005 | 2.00 | 993 | 1957 | 100% Adhesive |
| 5 | 1.013 | 0.50 | 0.005 | 2.00 | 1032 | 2038 | 100% Adhesive |
|   |   |   |   |   | AVERAGE IMPROVEMENT | 1993 81.8% |   |
| PANEL 6B |   |   |   |   |   |   |   |
| 1 | 1.015 | 0.50 | 0.005 | 4.00 | 1026 | 2022 | 100% Adhesive |
| 2 | 1.015 | 0.50 | 0.005 | 4.00 | 1014 | 1998 | 100%Adhesive |
| 3 | 1.014 | 0.50 | 0.005 | 4.00 | 1035 | 2041 | 100% Adhesive |
| 4 | 1.017 | 0.50 | 0.005 | 4.00 | 1036 | 2037 | 100% Adhesive |
| 5 | 1.012 | 0.50 | 0.005 | 4.00 | 924 | 1826 | 100% Adhesive |
|   |   |   |   |   | AVERAGE IMPROVEMENT | 1985 81.1% |   |

As demonstrated by these test results, Panel 2B wiped with a novel wipe solvent composition containing as little as 0.2% by volume of the silane coupling agent, based upon the total volume of the composition imparts an average shear strength of 1581 psi for five samples compared to the average shear strength of 1096 psi for the five sample panels wiped with the naphtha solvent containing no silane coupling agent, an increase of 44.3%. Substantially greater improvement is obtained through the use of greater amounts of the silane additive in the wipe solvent compositions used to treat Panels 4B, 5B and 6B.

Similar results are obtained with Alodined substrates, pre-treated with Scotchbrite® pads to remove the Alodine. The use of wipe solvent compositions containing 0.2% by volume and 0.5% by volume of Z-6040 silane coupler increases the average shear strength to 1904 psi and 2334 psi, respectively , compared to similar panels treated with the same wipe solvent which does not contain any silane coupling agent and which have an average shear strength of only 1613 psi.

EXAMPLE 3

This example demonstrates the improved bonding strength imparted to deoxidized aluminum substrates primed with curable epoxy resin coatings commercially-available under the trademark Spraylat® containing an activator. The substrates are deoxidized in the same manner as Panels 1A and 2A of Example 1.

The deoxidized aluminum panels are rinsed with water, dry wiped, solvent wiped, dried and coated with Spraylat epoxy primer 30–40 minutes after final wiping. The primed panels are cured for six days at room temperature, and then cured for 24 hours at 150° F. The cured panels are wiped with methyl ethyl ketone solvent, and dry wiped. The primed panels are bonded with GA100BD12 epoxy adhesive (Hysol EA 9394) 30–40 minutes after dry wiping, cured for 20 hours at room temperature, following by 2 hours at 150° F. The panels are then subjected to lap shear testing according to ASTM D-1002.

For Panels 1C, the first solvent wipe applied directly to the deoxidized aluminum panels, prior to priming, consists of a naphtha solvent, whereas the first solvent wipe applied directly to the deoxidized aluminum panels 2C, 3C, 4C and 5C consists of a novel wipe composition containing various amounts by volume of Z-6040 silane coupling agent, as indicated. The average shear strength psi values are:

| Panels | % Silane Z-6040 | Shear Strength, psi Minimum | Maximum | Average | Improvement % |
|---|---|---|---|---|---|
| 1C | 0 | 819 | 945 | 874 | Baseline |
| 2C | 0.1 | 1097 | 1247 | 1175 | 34 |
| 3C | 0.2 | 1109 | 1190 | 1151 | 32 |
| 4C | 1.0 | 920 | 1313 | 1207 | 38 |
| 5C | 2.0 | 1363 | 1448 | 1401 | 60 |

The following Example 4 demonstrates the improved shear strength imparted to graphite epoxy laminates bonded to each other by means of epoxy resin adhesive.

EXAMPLE 4

A plurality of graphite epoxy composite panels are provided by removing the peel ply, solvent wiped, dry wiped, sanded with 220 grit silicon carbide paper, solvent wiped, dry wiped, and coated with epoxy resin (Hysol EA 9391) adhesive within 30–40 minutes after final wipe. The composite panels are cured for at least 20 hours at room temperature, following by 2 hours at 150° F. The cured panels are tested for shear strength according to ASTM D 1002. The solvent wipe applied to Panels 1D consists solely of naphtha solvent whereas the wipe solvent composition applied to Panels 2D and 3D comprises a novel wipe solvent composition consisting of naphtha and 2% by volume of Z-6011 silane and 2% by volume of Z-6040 silane, respectively. The test results are as follows:

| Panel | Solvent | Shear Strength, psi (5 Coupons Per Solvent) Minimum | Maximum | Average | % Increase |
|---|---|---|---|---|---|
| 1D | Tolu-Sol WHT Only | 1578 | 2074 | 1790 | — |
| 2D | Tolu-Sol WHT + 2% Z-6011 | 1755 | 2118 | 1921 | 7.3 |
| 3D | Tolu-Sol WHT + 2% Z-6040 | 1679 | 2402 | 1989 | 11.1 |

The test results demonstrate an improvement in average shear strength obtained by the use of the present novel wipe solvent compositions for the bonding of composite laminates to each other.

EXAMPLE 5

This example demonstrates the cleaning properties as well as the adhesion promoting properties of the present solvent wipe compositions when applied to bare aluminum substrates soiled with various lubricating oils and pastes.

A plurality of test panels of bare 2024-T3 aluminum were soiled with a mixture of lubricant drilling, press forming and cutting oils and pastes and allowed to stand for 24 hours. After 24 hours the panels were dry wiped with clean dry cloth, solvent wiped, dry wiped, abraded with Scotch-Brite™#7447 (silicon carbide/aluminum oxide), solvent wiped, dry wiped, and within 1–2 hours bonded with GA100BD12 epoxy adhesive to form lap shear test panels per ASTM D1002. The panels were allowed to cure at room temperatures for 7 days, followed by baking at 150° F. for 2 hours. The panels were then band-sawed into lap shear test specimens per ASTM specification.

The following tables illustrate the comparative shear strength psi values for the different lap shear test panels cleaned and coated with the indicated wipe solvents with and without the addition of the present silane compiling agents.

| SPEC NO. | WIDTH INCHES | OVERLAP INCHES | BONDLINE INCHES | FAIL LOAD LBS | SHEAR STRENGTH PSI | MODE OF FAILURE |
|---|---|---|---|---|---|---|
| MPK | | | | | | |
| 1 | 1.003 | 0.50 | 0.005 | 556 | 1109 | 100% ADHESIVE |
| 2 | 1.000 | 0.50 | 0.005 | 562 | 1124 | 100% ADHESIVE |
| 3 | 1.000 | 0.50 | 0.005 | 686 | 1372 | 100% ADHESIVE |
| 4 | 1.006 | 0.50 | 0.005 | 710 | 1412 | 100% ADHESIVE |
| 5 | 0.999 | 0.50 | 0.005 | 692 | 1385 | 100% ADHESIVE |
| | | | | AVERAGE | 1280 | |
| MPK 5% Z-6040 SILANE | | | | | | |
| 1 | 1.002 | 0.50 | 0.005 | 1300 | 2595 | 100% ADHESIVE |
| 2 | 1.002 | 0.50 | 0.005 | 1460 | 2917 | 100% ADHESIVE |
| 3 | 1.002 | 0.50 | 0.005 | 2458 | 2910 | 100% ADHESIVE |
| 4 | 1.003 | 0.50 | 0.005 | 1598 | 3186 | 100% ADHESIVE |
| 5 | 1.003 | 0.50 | 0.005 | 1048 | 2090 | 100% ADHESIVE |
| | | | | AVERAGE | 2740 | |
| NAPHTHA/MPK TECH GRADE | | | | | | |
| 1 | 1.002 | 0.50 | 0.005 | 618 | 1234 | 100% ADHESIVE |
| 2 | 1.003 | 0.50 | 0.005 | 632 | 1260 | 100% ADHESIVE |
| 3 | 0.998 | 0.50 | 0.005 | 608 | 1218 | 100% ADHESIVE |

-continued

| SPEC NO. | WIDTH INCHES | OVERLAP INCHES | BONDLINE INCHES | FAIL LOAD LBS | SHEAR STRENGTH PSI | MODE OF FAILURE |
|---|---|---|---|---|---|---|
| 4 | 1.002 | 0.50 | 0.005 | 654 | 1305 | 100% ADHESIVE |
| 5 | 1.005 | 0.50 | 0.005 | 638 | 1270 | 100% ADHESIVE |
| | | | | AVERAGE | 1257 | |

NAPHTHA/MPK TECH GRADE 5% Z-6040 SILANE

| 1 | 1.000 | 0.50 | 0.005 | 1540 | 3080 | 100% ADHESIVE |
| 2 | 1.002 | 0.50 | 0.005 | 1076 | 2148 | 100% ADHESIVE |
| 3 | 0.999 | 0.50 | 0.005 | 1122 | 2246 | 100% ADHESIVE |
| 4 | 1.002 | 0.50 | 0.005 | 1256 | 2507 | 100% ADHESIVE |
| 5 | 1.003 | 0.50 | 0.005 | 1186 | 2365 | 100% ADHESIVE |
| | | | | AVERAGE | 2469 | |

82% TECH GRADE MPK, 15% IPA,3% D.I. WATER

| 1 | 1.001 | 0.50 | 0.005 | 740 | 1478 | 100% ADHESIVE |
| 2 | 1.005 | 0.50 | 0.005 | 780 | 1552 | 100% ADHESIVE |
| 3 | 1.002 | 0.50 | 0.005 | 822 | 1641 | 100% ADHESIVE |
| 4 | 1.002 | 0.50 | 0.005 | 840 | 1677 | 100% ADHESIVE |
| 5 | 1.004 | 0.50 | 0.005 | 868 | 1729 | 100% ADHESIVE |
| | | | | AVERAGE | 1615 | |

(82% TECH GRADE MPK, 15% IPA,3%0.1. WATER) 5% Z-6040

| 1 | 1.006 | 0.50 | 0.005 | 1638 | 3260 | 100% ADHESIVE |
| 2 | 1.002 | 0.50 | 0.005 | 1638 | 3269 | 100% ADHESIVE |
| 3 | 1.003 | 0.50 | 0.005 | 1536 | 3063 | 100% ADHESIVE |
| 4 | 1.005 | 0.50 | 0.005 | 1634 | 3261 | 100% ADHESIVE |
| 5 | 1.001 | 0.50 | 0.005 | 1636 | 3269 | 100% ADHESIVE |
| | | | | AVERAGE | 3224 | |

The first wipe solvent MPK (methyl propyl ketone) is commercially-available under the trademark Eastman® Methyl Propyl Ketone.

The second wipe solvent Naphtha/MPK is commercially-available as a 50:50 mixture under the trademark Tolu-Sol® WHT and MPK.

The third wipe solvent comprises a blend of methyl propyl ketone, isopropyl alcohol and deionized water.

Each of these wipe solvents is compared to corresponding wipe solvent compositions containing 5% by volume of Dow Corning Z-6040 silane coupling agent to produce substantial increases in the average shear strength equal to 114%, 96% and 99%, respectively.

The present process also can be used to replace the need for the conventional protection of aluminum and its alloys with chromate conversion coatings such as Alodine® coatings, while still achieving the required properties for paint adhesion, salt spray protection, filiform corrosion protection, etc., as illustrated by the comparative data in the following Example and table.

EXAMPLE 6

This Example illustrates the comparative adhesion properties and corrosion resistance properties of bare aluminum substrates QQ-A-250/4 and QQ-A-250/12 and aluminum alloy-clad aluminum substrates (250/4 and 250/12) which are (1) Alodined (MIL-C-5541), (2) Anodized (PAA) or (3) untreated prior to surface preparation and priming with chromated primer and non-chromated primer, respectively.

| Property | Test Method (MIL-P-85582) | Substrate | Surface Prep | # of Spec | Chromated Primer (Deft 44GN36)* | Non-Chromated Primer (Deft 46GN05)* | Comments |
|---|---|---|---|---|---|---|---|
| Adhesion<br>A. Dry-RT<br>B. Wet<br>C. Dry-350° F. | Fed Std 141B Method 6301 ASTM D3359 | QQ-A-250/5 (T3) | 1. Deoxidize-See 1/<br>2. PAA-See 2/<br>3. NGC Nonchrome -See Note 3/ | 3 | 1A-pass<br>1B-pass<br>1C-pass<br>2A-pass<br>2B-pass<br>2C-pass<br>3A-pass<br>3B-pass<br>3C-pass | 1A-pass<br>1B-pass<br>1C-pass<br>2A-pass<br>2B-pass<br>2C-pass<br>3A-pass<br>3B-pass<br>3C-pass | 1/ Immerse test panel for 2 minutes in corrosion removing compound to MIL-C-38334, Type 1, Class 1, then remove test panel and rinse with distilled water. Apply the primer coating within one hour.<br>2/ Phosphoric Acid Anodize (PAA) In accordance BAC 5555<br>3/ See FIG (1) |

-continued

| Property | Test Method (MIL-P-85582) | Substrate | Surface Prep | # of Spec | Chromated Primer (Deft 44GN36)* | Non-Chromated Primer (Deft 46GN05)* | Comments |
|---|---|---|---|---|---|---|---|
| Adhesion-Cross Hatch | N/A | QQ-A-250/4 (T3) | 1. MIL-C-5541 2. PAA 3. NGC Nonchrome | 3 | 1-pass 2-pass 3-pass | 1-fail (5%) 2-pass 3-pass | Spec requires No Adhesion Loss > 2%; Adhesion of Nonchrome Primer Improved w/NGC Surface Treatment |
| Adhesion-Intercoat | Fed Std 6301 | QQ-A-250/5 (T3) | 1. Deoxidize-See 1/ 2. PAA 3. NGC Nonchrome | 3 | 1-pass 2-pass 3-pass | 1-pass 2-pass 3-pass | Allow Primer to Dry for a minimum of two hours prior to topcoat application |
| Flexibility -1" Mandrel A. RT B. 350° F. | Fed Std 141 Method 6221 | QQ-A-250/4 (T3) | 1. MIL-C-5541 2. PAA 3. NGC Nonchrome | 3 | 1A-pass 1B-pass 2A-pass 2B-pass 3A-pass 3B-pass | 1A-pass 1B-pass 2A-pass 2B-pass 3A-pass 3B-pass | |
| Strippability | MIL-P-85582 para 4.6.4 | QQ-A-250/4 (T3) | 1. MIL-C-5541 2. PAA 3. NGC Nonchrome | 3 | 1-pass 2-fail 3-fail | 1-pass 2-fail 3-fail | 90% of Coating Must Be Removed w/MIL-R-81294; Failure to Remove Coating w/PAA and NGC Surface Treatment Indicates Enhanced Adhesion |
| Water Resistance-Primer Only | MIL-P-85582 para 4.6.6 | QQ-A-250/4 (T3) | 1. MIL-C-5541 2. PAA 3. NGC Nonchrome | 3 | 1-pass 2-pass 3-pass | 1-pass 2-pass 3-pass | 4 Day Immersion @ 120 F. |
| Water Resistance-Primer + Topcoat | MIL-P-85582 para 4.6.6 | QQ-A-250/4 (T3) | 1. MIL-C-5541 2. PAA 3. NGC Nonchrome | 3 | 1-pass 2-pass 3-pass | 1-pass 2-fail* 3-pass | *One Small Blister on 1 of 3 Test Panels |
| Humidity Resistance | ASTM D2247 | QQ-A-250/4 (T3) | 1. MIL-C-5541 2. PAA 3. NGC Nonchrome | 3 | Pass | Pass | 30 Days @ 140° F.; 100% RH |
| Salt Spray Corrosion (A1) | ASTM B117 | QQ-A-250/4 (T3) | 1. MIL-C-5541 2.PAA 3. NGC Nonchrome | 10 | 1-3024 hrs 2-3024 hrs 3-3024 hrs | 1-3024 hrs 2-3024 hrs 3-3360 hrs | 3000 Hour Exposure |
| Salt Spray Corrosion (A1) | ASTM B117 | QQ-A-250/12 (T6) | 1. MIL-C-5541 2. PAA 3. NGC Nonchrome | 10 | 1. No Test 2. No Test 3-3024 | 1-3360 2-3360 3-3360 | 3000 Hour Exposure Using 7075-T6 |
| Filiform Corrosion | MIL-P-85582 para 4.6.7.2 ASTM D2803 | QQ-A-250/5 (T3) | 1. MIL-C-5541 2. PAA 3. NGC Nonchrome | 10 | 1-pass 2-pass 3-pass | 1-pass 2-pass 3-pass | 1000 Hour Exposure |
| Fluid Resistance A. MIL-L-23699 B. MIL-H-83282 | MIL-P-85582 para 4.6.9 | QQ-A-250/4 (T3) | 1. MIL-C-55441 2. PAA 3. NGC Nonchrome | 3 | 1A-pass 1B-pass 2A-pass 2B-pass 3A-pass 3B-pass | 1A-pass 1B-pass 2A-pass 2B-pass 3A-pass 3B-pass | |

The stated number of specimens were treated and tested, as indicated, to provide the indicated results. As shown, the NGC Nonchrome specimens #3, which are neither anodized nor Alodined, but are surface treated in accordance with the novel solvent wipe process of the present invention, illustrated by FIG. 1 of the drawing, provide equal or better primer adhesion and corrosion-resistance than the corresponding Alodined specimens #1 (MIL-C-5541) and phosphoric acid anodized specimens #2 (PAA). Thus the present process provides a useful alternative to the use of chromium-containing conversion coatings (Alodine) and to proprietary PAA anodized coatings, and enables the use of non-chromated primer compositions (DEFT 46GN05 -chrome-free epoxy resin) primer paint composition or chromium-containing primer composition (DEFT 44GN36 strontium chromate polyamide resin). Thus the present process enables the elimination of chromium from the surface preparation prior to priming to meet certain enviromental considerations and military specification requirements.

Many variations of the present invention will suggest themselves to those skilled in this art in light of the above, detailed description. All such obvious variations are within the full intended scope of the appended claims.

What is claimed is:

1. A wipe solvent composition for cleaning a metal substrate and for depositing on the cleaned substrate a residue consisting essentially of a polyfunctional coupling agent which is bonded to the metal substrate and which is bondable to an organic coating to be applied thereover, said composition consisting essentially of 95 to 99.9% by volume of an environmentally-acceptable volatile organic solvent having a composite vapor pressure below about 45 mm Hg and 0.1 to 5%, by volume of 3-glycidoxypropyltrimethoxy silane polyfunctional coupling agent having a bonding affinity for a metal substrate surface cleanable by said solvent and for an organic coating applied to said surface.

2. A wipe solvent composition according to claim 1 in which said solvent comprises naphtha.

3. A wipe solvent composition according to claim 1 in which the volatile organic solvent comprises a mixture of naphtha and methyl propyl ketone.

4. A wipe solvent composition according to claim 1 in which the volatile organic solvent comprises a mixture or blend of solvents with a composite vapor pressure less than 45 mm Hg.

* * * * *